(12) United States Patent
Jackson

(10) Patent No.: US 12,301,054 B2
(45) Date of Patent: *May 13, 2025

(54) ELECTRIC MOTOR

(71) Applicant: FISHER & PAYKEL APPLIANCES LIMITED, Auckland (NZ)

(72) Inventor: Russell Joseph Jackson, Auckland (NZ)

(73) Assignee: FISHER & PAYKEL APPLIANCES LIMITED (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,485

(22) Filed: Mar. 11, 2024

(65) Prior Publication Data

US 2024/0213826 A1    Jun. 27, 2024

Related U.S. Application Data

(63) Continuation of application No. 18/104,529, filed on Feb. 1, 2023, now Pat. No. 11,962,185, which is a continuation of application No. 17/826,593, filed on May 27, 2022, now Pat. No. 11,601,022, which is a continuation of application No. PCT/IB2020/061198, filed on Nov. 27, 2020.

(30) Foreign Application Priority Data

Nov. 27, 2019    (NZ) ....................... 759454

(51) Int. Cl.
| | | |
|---|---|---|
| *H02K 1/14* | (2006.01) | |
| *D06F 37/20* | (2006.01) | |
| *D06F 37/30* | (2020.01) | |
| *H02K 1/18* | (2006.01) | |
| *H02K 1/2791* | (2022.01) | |
| *H02K 5/16* | (2006.01) | |
| *H02K 7/08* | (2006.01) | |
| *H02K 7/14* | (2006.01) | |
| *H02K 5/24* | (2006.01) | |

(52) U.S. Cl.
CPC .......... *H02K 1/148* (2013.01); *D06F 37/206* (2013.01); *D06F 37/304* (2013.01); *H02K 1/187* (2013.01); *H02K 1/2791* (2022.01); *H02K 5/16* (2013.01); *H02K 7/08* (2013.01); *H02K 7/14* (2013.01); *H02K 5/24* (2013.01)

(58) Field of Classification Search
CPC ...... H02K 1/148; H02K 1/2791; H02K 1/187; H02K 5/16; H02K 7/08; H02K 7/14; H02K 5/24; D06F 37/206; D06F 37/304
See application file for complete search history.

(56) References Cited

U.S. PATENT DOCUMENTS

| | | |
|---|---|---|
| 8,063,524 B2 | 11/2011 | Shin et al. |
| 9,013,086 B2 | 4/2015 | Dokonal |

(Continued)

FOREIGN PATENT DOCUMENTS

| | | |
|---|---|---|
| CN | 101553969 A | 10/2009 |
| CN | 109494913 A | 3/2019 |

(Continued)

*Primary Examiner* — Terrance L Kenerly
(74) *Attorney, Agent, or Firm* — Clark Hill PLC; James R. Foley

(57) ABSTRACT

An electric motor suitable for use in a laundry machine comprises an improved stator and/or rotor design.

9 Claims, 10 Drawing Sheets

(56) References Cited

U.S. PATENT DOCUMENTS

| | | |
|---|---|---|
| 11,962,185 B2* | 4/2024 | Jackson ................ D06F 37/304 |
| 2005/0097928 A1 | 5/2005 | Choi |
| 2008/0084126 A1 | 4/2008 | Lee |
| 2009/0211312 A1 | 8/2009 | Ahn |
| 2010/0236297 A1 | 9/2010 | Ahn et al. |
| 2013/0025330 A1 | 1/2013 | Bae |
| 2013/0036773 A1 | 2/2013 | Choi et al. |
| 2013/0140926 A1 | 6/2013 | Gui et al. |
| 2013/0328438 A1 | 12/2013 | Jang et al. |
| 2015/0145361 A1 | 5/2015 | Peterson |
| 2015/0222158 A1 | 8/2015 | Lee et al. |

FOREIGN PATENT DOCUMENTS

| | | |
|---|---|---|
| JP | 2011067053 A | 3/2011 |
| KR | 20140111355 A | 9/2014 |

* cited by examiner

ELECTRIC MOTOR

RELATED APPLICATION (PRIORITY CLAIM)

The present application is a continuation of U.S. patent application Ser. No. 18/104,529, filed Feb. 1, 2023, which is a continuation of U.S. patent application Ser. No. 17/826,593, filed May 27, 2022, now U.S. Pat. No. 11,601,022, which is a continuation of International Application No. PCT/IB2020/061198, filed Nov. 27, 2020, which claims the benefit of New Zealand Patent Application No. 759454, filed Nov. 27, 2019, all of which are hereby incorporated by reference in their entirety.

TECHNICAL FIELD

The invention relates to compact electric motor suitable for use in for example a laundry washing machine or dryer or washer-dryer.

BACKGROUND

Direct-drive electric motors are commonly used in laundry washing machines. The motor directly drives a drum shaft without a belt or other form of motion transmission device between the rotor and shaft.

One of the requirements for a direct drive electric motor in a washing machine is that the motor be of a minimum thickness so the motor does not take space from the washing machine tub (therefore the washing machine can accommodate a larger amount of clothes for a given footprint-washer capacity).

Another requirement is that the motor or machine powered by the motor operates with as little vibration and as silently as possible. Vibration in operation of an electric motor is undesirable and can lead to noise, and low vibration and noise is an important requirement for electric motors in most applications.

It is an object of the invention to provide an improved or at least alternative form of direct-drive electric motor suitable for use in a laundry washing machine.

SUMMARY OF INVENTION

Stator

In broad terms in one aspect the invention comprises a stator for an electric motor for a washing machine or dryer or washer-dryer, comprising:
- a core of magnetically permeable material including an annular core ring and stator poles spaced around and extending radially outward from the core ring,
- a polymeric insulating structure surrounding the stator poles and comprising:
  - a side at least partially covering an axially upper surface of the core ring,
  - a cylindrical wall at least partially covering a radially inner surface of the core ring, and further comprising two or more fastener supports for receiving fasteners at a fastener receiving portion, to fasten the stator to a non-rotating bearing hub or tub or drum or bearing housing, of said washing machine or dryer or washer-dryer.

In at least some embodiments each of said fastener supports comprise a pair of axially directed walls and at least one axially directed intermediate wall located intermediate of the pair of walls, which project radially inward from the cylindrical wall to connect with the fastener receiving portion.

In at least some embodiments each of said axially directed walls and axially directed intermediate walls have a substantially uniform thickness in the tangential direction, and a radial length of at least twice the thickness in the tangential direction.

In at least some embodiments each of said axially directed walls and axially directed intermediate walls have a substantially uniform thickness in the tangential direction, and a radial length and axial height of at least twice the thickness in the tangential direction.

In at least some embodiments the fastener supports comprises a plurality of axially directed intermediate walls located intermediate of said pair of axially directed walls.

In at least some embodiments the stator comprises one or more shelves located between adjacent fastener supports, wherein said shelves extend radially inwards from the cylindrical wall, and are spaced apart from the fastener supports to define gaps between the shelves and fastener supports around the cylindrical wall.

In at least some embodiments the fastener supports comprise surfaces for interfacing with and aligning the fastener support structure to one or more corresponding surfaces on the hub or tub or drum or bearing housing, said corresponding surfaces being concentric with the bearing axis.

In at least some embodiments the shelves comprise upper surfaces which are offset below said side of the insulating structure.

In at least some embodiments the one or more of the shelves carry one or more terminal mounts such that the terminal mount is located partially below said side of the core ring.

In at least some embodiments the fastener supports and shelves are integrally formed with the insulating structure.

Rotor

In broad terms in another aspect the invention comprises a rotor for an electric motor for a washing machine or dryer or washer-dryer, comprising a hub for connecting the rotor to a shaft, a perimeter portion at where the rotor interacts with a stator of the motor to cause the rotor to rotate about an axis of rotation, and a rotor frame comprising a leg portion and an annular portion which together provide a structural connection between the hub and the perimeter portion, wherein
  the leg portion comprises a plurality of legs extending from the hub radially outwards towards the annular portion, each leg having an inner end at the hub, the inner ends of a first plurality of legs being axially spaced from the inner ends of a second plurality of legs, and
  wherein the annular portion comprises a plurality of substantially planar first wall segments, each defining an upper face of the rotor frame, and a plurality of substantially planar second wall segments axially offset below the first wall segments, said first wall segments and second wall segments being arranged adjacent one another in an alternating fashion about a central axis of the rotor frame.

In at least some embodiments the substantially planar first wall segments and substantially planar second wall segments extend at different angles relative to the rotational axis through the hub.

In at least some embodiments the rotor frame further comprises one or more ribs extending between adjacent first and second wall segments of the annular portion.

In at least some embodiments the substantially planar first wall segments and/or substantially planar second wall segments or part(s) thereof extend at a non-zero angle to adjacent leg portions to which the segments connect.

In at least some embodiments outer ends of the first plurality of legs are less axially spaced from outer ends of the second plurality of legs than the inner ends, or the outer ends of the first plurality of legs are not axially spaced from the outer ends of the second plurality of legs, and/or wherein said legs, at a radially outward region, converge to a common axial position substantially coincident with that of the annular portion.

In at least some embodiments one or more axially directed walls connect an edge of each first wall segment with an edge of a second wall segment.

In at least some embodiments the radial dimension of the annular portion is between 0.5 and 1.5 times the radial dimension of the leg portion and/or the radial length of the poles and coils on an associated stator.

In broad terms in a further aspect the invention comprises a rotor for an electric motor for a washing machine or dryer or washer-dryer, comprising a hub for mounting the rotor to a shaft, a perimeter portion for interacting with a stator of the motor to cause the rotor to rotate about an axis of rotation, and a frame between the hub and the perimeter portion, wherein
 the frame is formed from a polymeric material and includes a mount for a separate component (such as a magnet) which interacts with a sensor on the stator to indicate an absolute angular position of the rotor relative to the stator at least once per revolution, and
 the mount comprises a flexible hook to enable insertion of the component, and surfaces and abutments to support the component against forces and accelerations experienced in operation without support or assistance from any additional components, and
 the mount is moulded entirely as one part with the frame.

In broad terms in another aspect the invention comprises a rotor for an electric motor for a washing machine or dryer or washer-dryer, comprising a hub for connecting the rotor to a shaft, a perimeter portion for interacting with a stator of the motor to cause the rotor to rotate about an axis of rotation, and a frame between the hub and the perimeter portion, wherein
 the frame is formed from a polymeric material and includes a feature or mount for a component on the frame which interacts with a sensor on a stator to indicate an absolute angular position of the rotor relative to the stator at least once per revolution, and
 the hub comprises an axially extending opening for engagement with the shaft, and a specific protrusion or recess for interacting with a specific corresponding recess or protrusion on the shaft to ensure that the hub can only be mounted to the shaft in a single absolute angular position.

In broad terms in another aspect the invention comprises an electric motor for a washing machine, comprising a stator as herein described and a concentric rotor.

In broad terms in another aspect the invention comprises an electric motor for a washing machine, comprising a rotor as herein described and a stator.

In broad terms in another aspect the invention comprises an electric motor for a washing machine, comprising a stator and a rotor, both as herein described.

In broad terms in another aspect the invention comprises a laundry washing machine or dryer or washer-dryer comprising an electric motor as herein described.

Motor and Machine

The invention also includes an electric motor comprising the stator or rotor and a laundry machine or dryer or washer-dryer including an electric motor comprising the stator and/or rotor.

Definition

In this specification:
 "drum" and "tub" are used interchangeably and include a "basket" being a perforated drum or tub, where appropriate to the context; and
 "comprising" means "consisting at least in part of", and when interpreting a statement in this specification and claims that includes "comprising", features other than that or those prefaced by the term may also be present. Related terms such as "comprise" and "comprises" are to be interpreted similarly.

BRIEF DESCRIPTION OF DRAWINGS

Embodiments of the invention are described with reference to the accompanying drawings, in which.

DESCRIPTION OF EMBODIMENTS

Machine

Figure 1A:
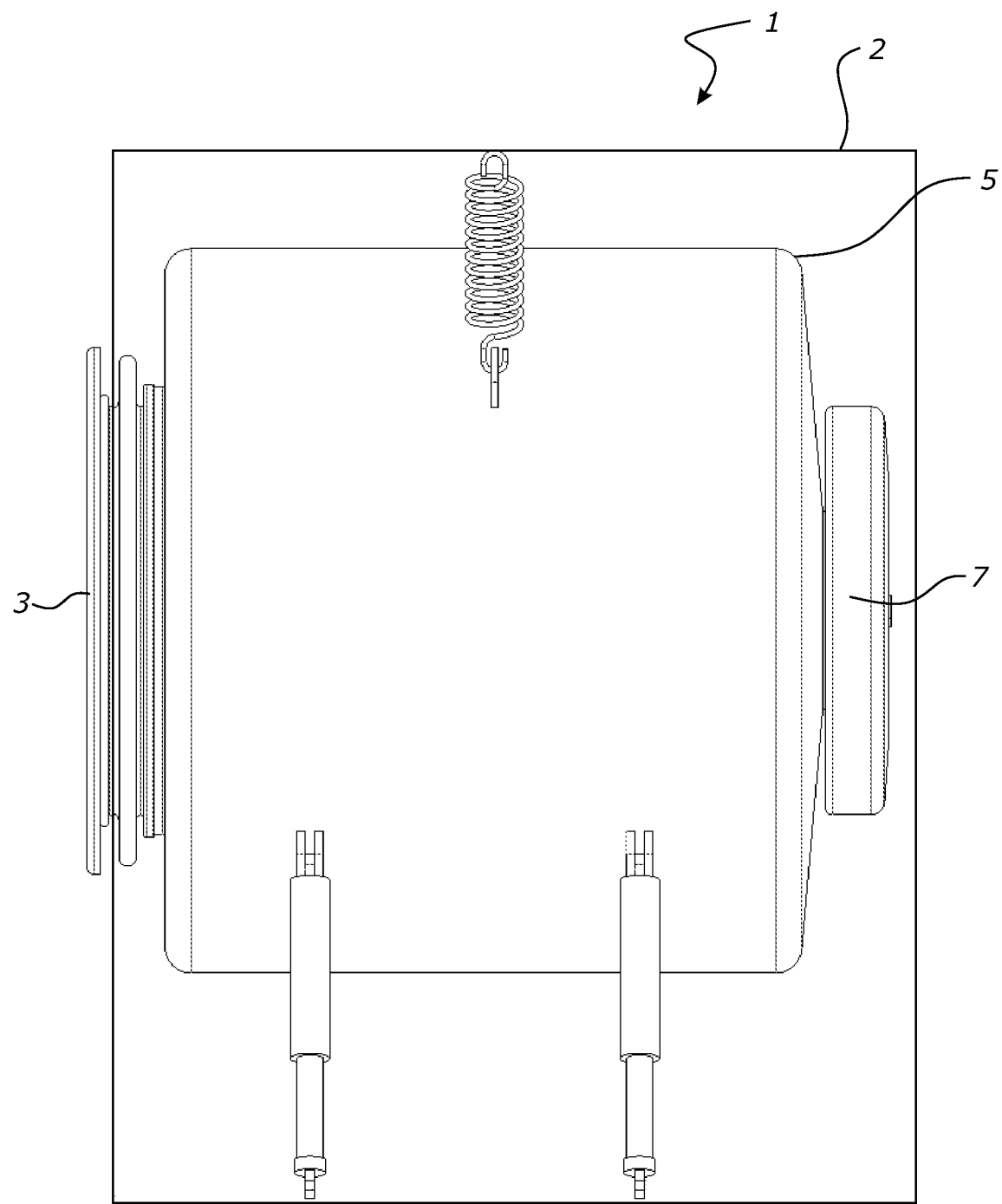
FIG. 1A is a partly vertical cross-sectioned view of a front-loading, horizontal axis laundry washing machine.
Figure 1B:
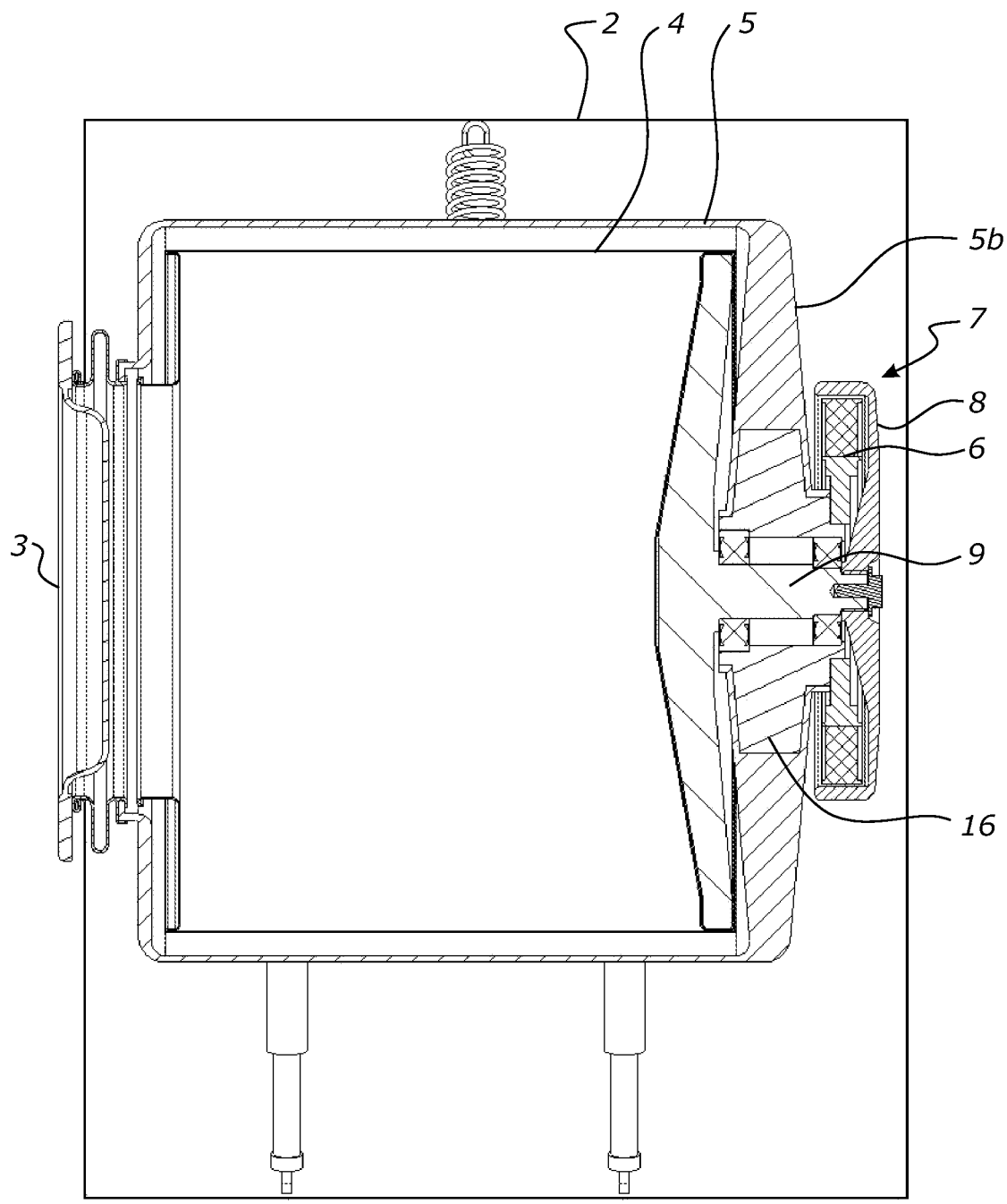
FIG. 1B is a fully vertical cross-sectioned view of a front loading, horizontal axis laundry washing machine.

Referring to FIG. 1A a laundry washing machine 1 of the front-loading, horizontal-axis variety is shown. The washing machine includes an outer cabinet 2 with a front door 3 allowing access to a perforated rotatable inner drum/basket 4 for holding a load of laundry such as clothing for washing, and mounted within the outer cabinet to rotate about a horizontal axis. A generally cylindrical, fixed (non-rotating) liquid outer drum/tub 5 for containing washing liquid is mounted (suspended) within the cabinet 2 around the inner drum 4. FIG. 1B shows the inner and outer drums 4 and 5 and motor 7 of a horizontal-axis machine fully cross-sectioned, in this case front loading, horizontal-axis machine and does not also show the external cabinet.

Figure 2:
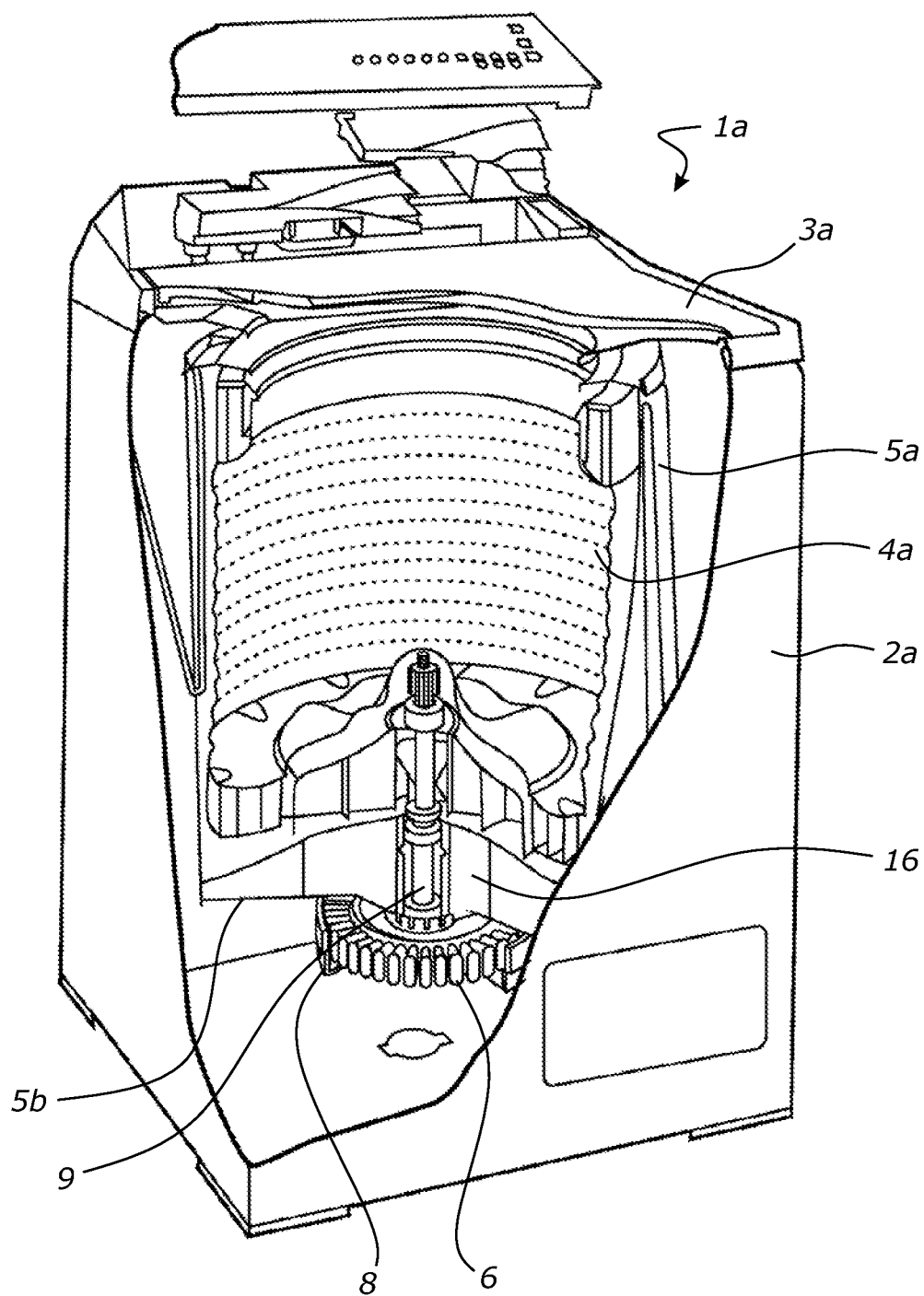
FIG. 2 is a part cutaway view of a top-loading, vertical axis laundry washing machine.

FIG. 2 is a part cutaway view of a top-loading, vertical axis laundry washing machine 1a. The machine includes an outer cabinet 2a with a lid 3a allowing access to a perforated rotatable inner drum/basket 4a for holding a load of laundry for washing, and mounted within the outer cabinet to rotate about a vertical axis. A generally cylindrical, fixed (non-rotating) liquid outer drum/tub 5a for containing washing liquid is mounted (suspended) within the cabinet 2a around the inner drum 4a.

The stator 6 of a Brushless DC (BLDC) or Permanent Magnet (PM) electric motor 7 is fixedly attached to the end 5b (see FIGS. 1B and 2) of the outer drum 5/5a, directly or alternatively indirectly by the stator 6 being attached to a bearing housing component 16 fixed to the end of the outer drum 5/5a. Rotor 8 external to the outer drum 5/5a is rotationally fixed to the outer end of a rotor shaft 9 which extends through a passage in the end of the outer drum 5/5a and carries the inner drum 4/4a at its other end. The rotor shaft 9 is mounted via at least one pair of spaced apart bearings, such as roller bearings carried by the bearing housing component 16. In a horizontal axis top or tilt access machine (not shown) the drum may be supported by bearings at both horizontal ends. A machine controller and/or motor controller (not shown) provide appropriate commutation signals to stator windings provided around the stator poles so that the rotor's rotational speed and direction may be dictated during the various cycles of a user-set wash programme of the machine.

Stator

FIGS. 3 to 5 and 5a show a stator 6 according to an embodiment of the invention, of a direct-drive electric motor suitable for use in a washing machine or a dryer or a washer-dryer.

The stator comprises an annular core ring 20 having a central opening 21, and which carries individual poles extending radially outward from the core ring 20 (transverse to the rotational axis of the rotor) around the core ring. The core ring and poles are formed of a magnetically permeable material. The core ring and stator poles may be formed as a stack of thin, generally circular steel laminations, or as a single helically-wound lamination. In at least some embodiments of the invention the stack of core ring and stator poles laminations is over-moulded, and encapsulated or partially encapsulated, by a polymeric material (herein also 'plastics') insulating structure. The stator coils are wound around the poles after plastics encapsulation, so that the plastics encapsulation insulates the coil windings from the steel stator poles. The poles and coils are indicated together at 22.

In at least some embodiments of the invention the insulating structure surrounding the stator poles is formed of a plastics material and comprises a planar side or wall 23 covering or at least partially covering an axially upper surface of the core ring 20, and a cylindrical wall 24 covering or at least partially covering a radially inner surface of the core ring.

Fastener supports 25 comprising a fastener receiving portion 25a defining an aperture or similar (typically each comprising a metal sleeve) for receiving fasteners to fix the stator, for example to the non-rotating drum 5 as indicated in FIGS. 1 and 2 and for example in particular a non-rotating bearing hub 16. In the embodiment pictured in FIGS. 3 to 5a, the fastener supports 25 are integrally formed with the plastics insulating structure. The fastener supports 25 extend radially inward of the cylindrical wall 24, with the fastener receiving portion 25a located at or near, or comprising, a radially innermost surface 27 of the fastener support 25. The fastener support 25 also comprises one or more (and preferably a pair of) axially directed walls 26 which project radially inward from the cylindrical wall 24, and connect with the fastener receiving portion. The axially directed walls 26 have uniform thickness (in the tangential direction), and a radial length of at least twice the tangential thickness. The radially innermost surface 27 of the fastener support 25 may be a curved shape for interfacing with, and aligning the fastener support 25 to, one or more corresponding curved surfaces of the bearing hub that are concentric with the bearing axis. The fastener supports 25 also comprise intermediate walls 28 as shown, which project radially inward from the cylindrical wall 24 and connect with the fastener receiving portion. The intermediate walls 28 also have uniform thickness (in the tangential direction), and a radial length of at least twice the tangential thickness.

In an alternative embodiment the fastener supports 25 may be integrally formed with the core ring 20 rather than the plastics insulating structure, or the fastener supports 25 may each comprise a metallic part formed with the core ring 20, which is over-moulded by the plastics insulating structure. There may be at least two fastener supports, for example between two and eight, and in some exemplary embodiments there are five fastener supports.

In at least some embodiments of the invention the stator also comprises one or more shelves 30 located between adjacent fastener supports 25, integrally moulded as part of the over-moulded insulating structure of the stator, which extend radially inwards from the cylindrical wall 24. One or more of the shelves 30 carry electrical terminal mounts or pockets 31 for connecting to the stator coils. The shelves 30 are offset below the surface of the insulating structure such that the terminal mounts 31 are located partially or wholly below the axially upper surface of the core ring. As shown, the terminal pockets can sit partially below the surface of the lamination stacks of the stator poles. This facilitates a compact and in particular low axial thickness or slim motor. Preferably the terminal parts on the lead wires which connect to the stator, are also low profile terminals such as flag terminals crimped directly to the lead wires.

Figure 3:
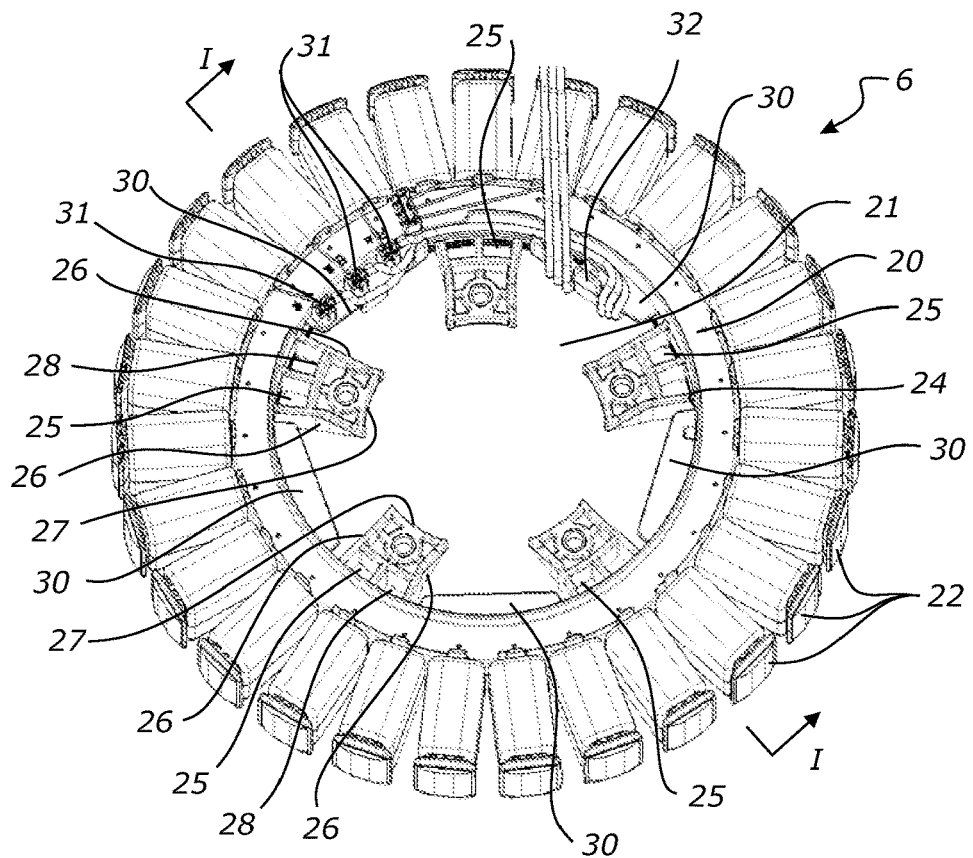
FIG. 3 is a perspective view of the stator of a direct-drive electric motor suitable for use in a laundry washing machine, according to an embodiment of the invention.

The shelves 30 may comprise a tab 32 on one or both sides, around which the lead wires pass before the terminal mounts 31, as a strain relief feature—see FIG. 3.

Also, the shelves 30 are structurally separated from the fastener supports 25 by gaps as shown, extending radially inward from the cylindrical wall 24 to the stator centre opening.

To reduce noise and vibration the structural response of the stator is optimized to attenuate internal torque oscillations and external accelerations. Reduced motor noise can be achieved by reducing the torsional stiffness of the connection between the stator and the component to which it is fixed (for example, bearing hub 16) so that torsional resonance is passed through at low speed and then at higher motor speed the compliance in the axially and radially directed walls 26, 28, reduces the transmission of torque oscillations from the motor into the drum and tub structure. However reducing torsional stiffness can also reduce the lateral and axial stiffness of the connection, causing airgap variation during operation, twisting and unwanted axial or lateral responses to tub vibrations. In at least some embodiments of the invention, minimizing torsional stiffness of the stator while maximizing axial and radial stiffness is achieved by connecting each fastener support 25 to the lamination over-mould of the insulating structure with walls, (26 and 28 in the embodiments shown) that have radial length and axial height, but are thinner in the tangential direction (relative to the radial length and axial height). Because the bending stiffness of each section of wall is a function of its tangential thickness×axial height, a series of radially projecting walls that have radial lengths and axial heights which are significantly greater than their tangential thickness, will create a stator structure that has low twisting or torsional stiffness but high axial and lateral stiffness.

Figure 4:
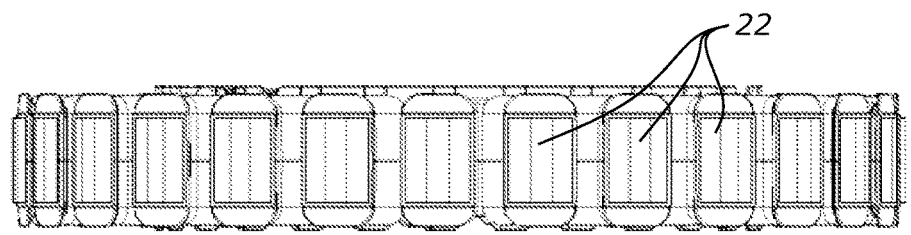
FIG. 4 is a peripheral edge view of the stator of FIG. 3.
Figure 5:
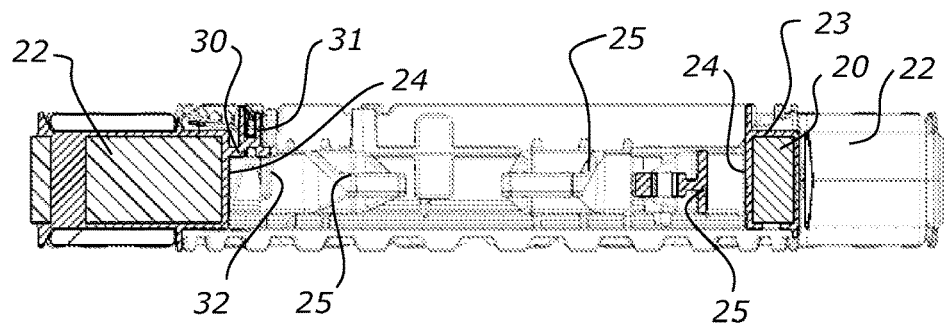
FIG. 5 is a cross-sectional view of the stator of FIGS. 3 and 4 along line I-I of FIG. 3.

In preferred embodiments the axial height of each wall 26, 28 is significantly greater (for example, at least two times greater) than its tangential thickness, and the radial length is at least twice the tangential thickness (for example, three or four times as long). In preferred embodiments each of the walls has a constant tangential thickness along its radial length, and optionally also a constant axial height. In some embodiments the radial length of the walls 26,28 may be between approximately $1/5^{th}$ and $1/15^{th}$ of the internal diameter of the core ring 20. For example, the radial length of the walls 26,28 may be approximately $1/8^{th}$ of the internal diameter of the core ring 20 as shown in FIGS. 3 to 5.

Figure 5A:
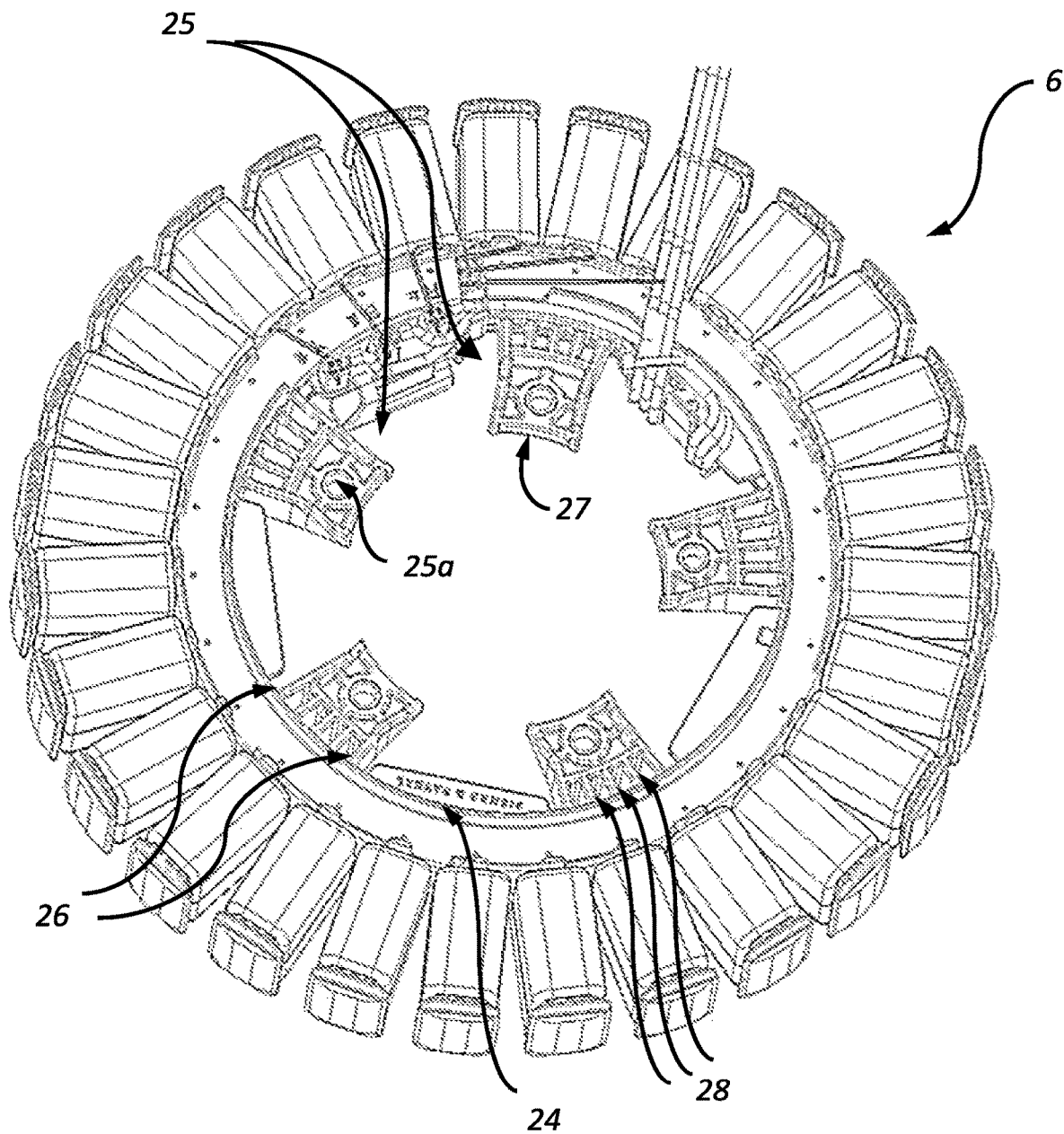
FIG. 5a is a perspective view of the stator of a direct-drive electric motor suitable for use in a laundry washing machine, as an alternative embodiment of the stator shown in FIGS. 3, 4 and 5.
Figure 6:
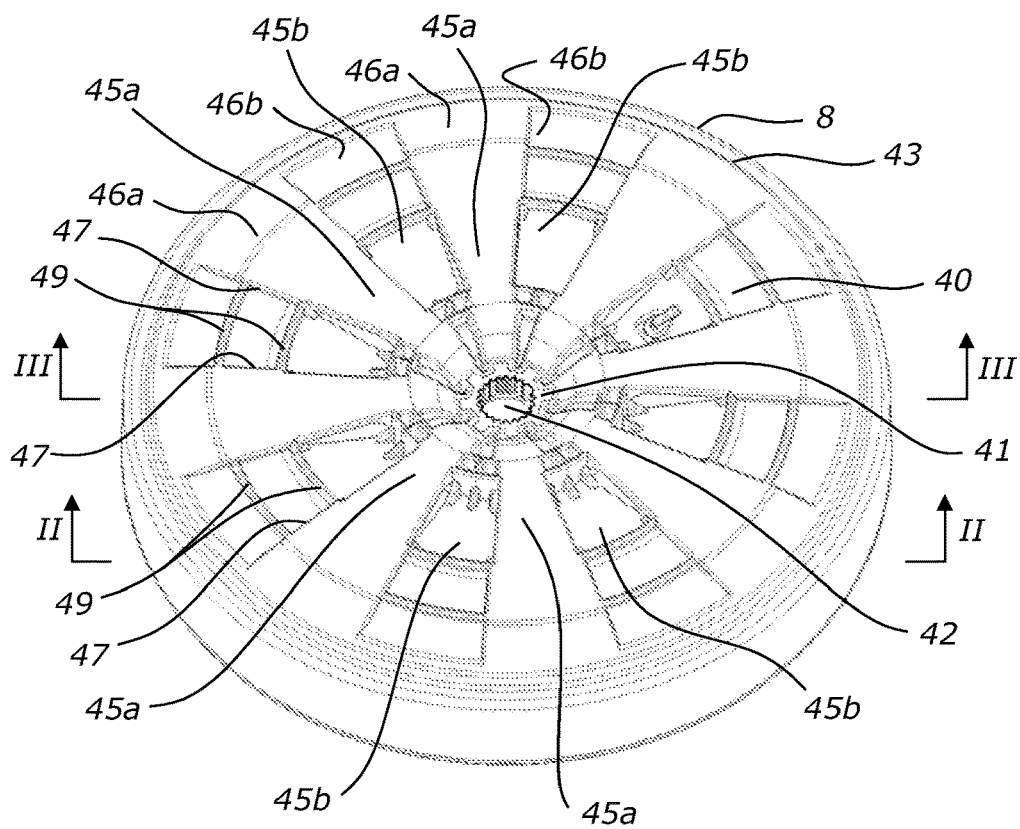
FIG. 6 is a perspective view from one side of the rotor of a direct-drive electric motor suitable for use in a laundry washing machine, according to an embodiment of the invention.
Figure 7:
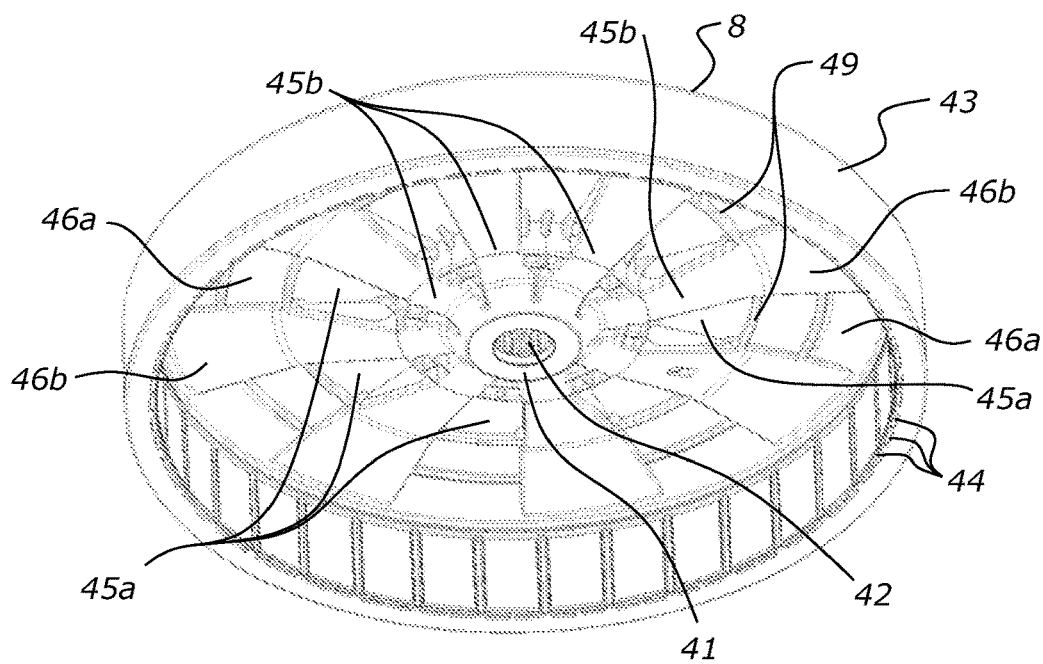
FIG. 7 is a perspective view from the opposite side, of the rotor of FIG. 6.
Figure 8:
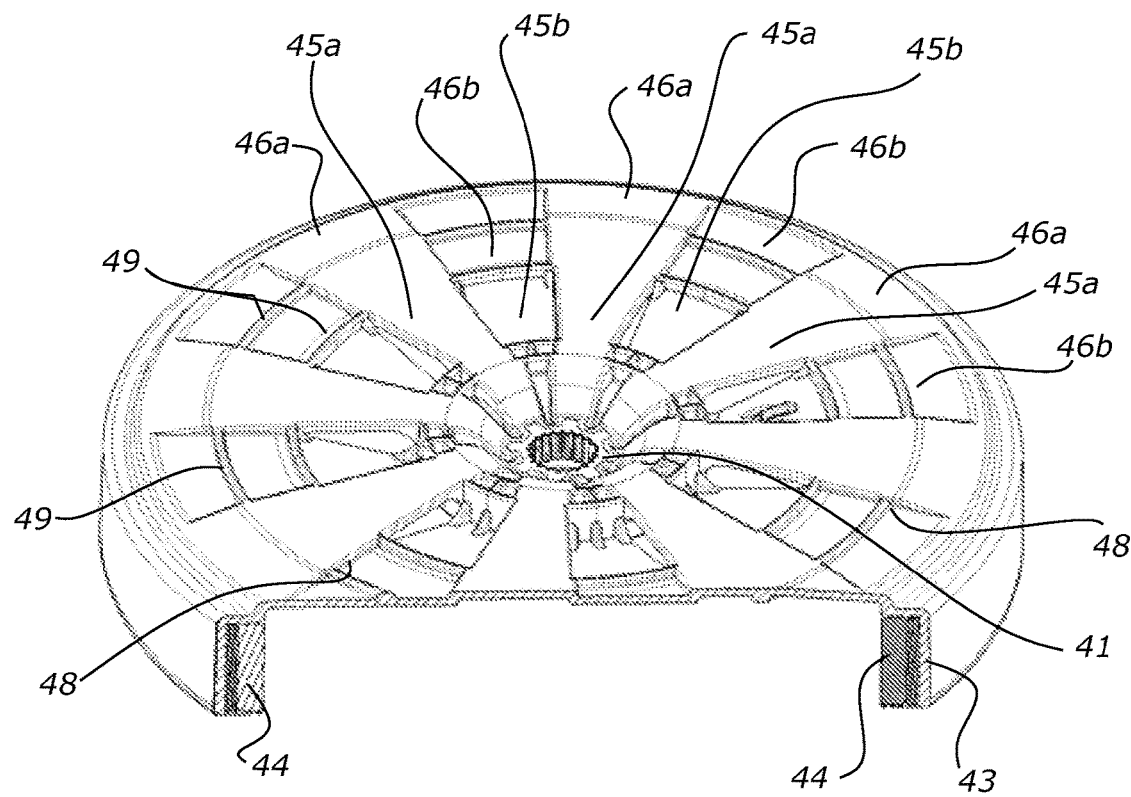
FIG. 8 is a cross-sectional view of the rotor of FIGS. 6 and 7 along line II-II of FIG. 6.
Figure 9:
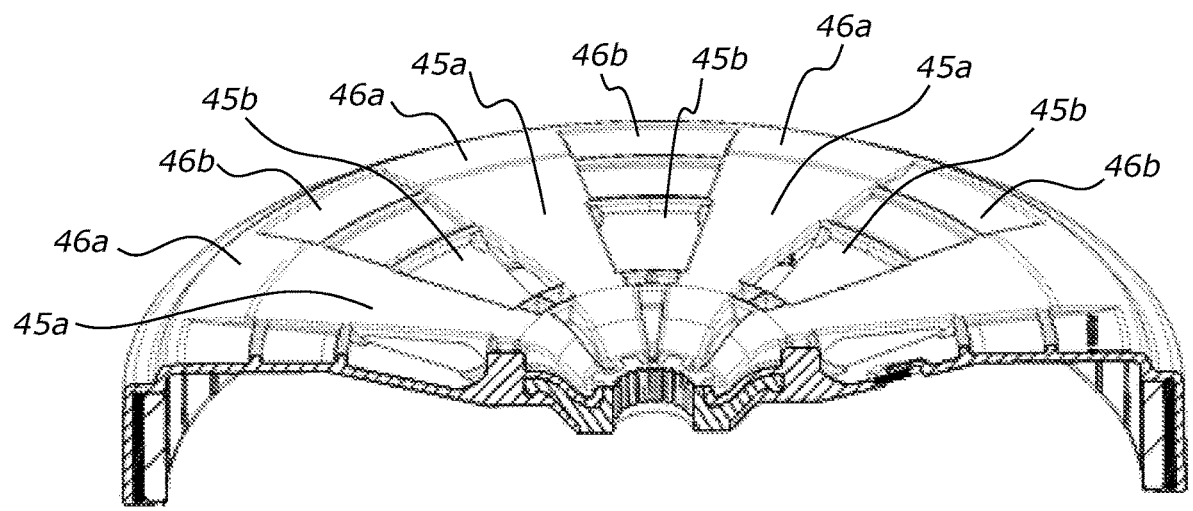
FIG. 9 is a cross-sectional view of the rotor of FIGS. 6 and 7 along line III-III of FIG. 6.

In alternative embodiments, the number of intermediate walls 28 of the fastener support 25 can be varied in order to adjust the overall stiffness of the connection between the stator and the component to which it is fixed (for example, bearing hub 16). Adjusting the fastener support stiffness enables tuning of the stator structure to avoid, to some extent, coincidence of resonance peaks and noise with rotational speeds/frequencies encountered during operation of the laundry washing machine or dryer or washer-dryer that are sustained for periods of time or cause particular dissatisfaction to the user (although it is possible that the machine may pass through those frequencies. as it spins up to speed and decelerates during the wash cycle). FIG. 5A shows an alternative embodiment to the stator shown in FIGS. 3 to 5, wherein the fastener mount 25 comprises three intermediate walls 28 between the pair of walls 26, rather than a single intermediate wall 28. In preferred embodiments, the fastener mount 25 comprises between one and three intermediate walls 28, and most preferably comprises three intermediate walls 28. In preferred embodiments the tangential thickness of the intermediate walls 28 may be substantially equal to that of the walls 26.

Rotor

FIGS. 6 to 13 and in particular FIGS. 6 to 9 show a rotor according to an embodiment of the invention, of a direct-drive electric motor suitable for use in a washing machine or a dryer or a washer-dryer. The rotor of FIGS. 6 to 9 is designed to be used with the stator of FIGS. 3 to 5 and vice versa.

The rotor 8 preferably comprises a relatively light-weight yet rigid and cost-effective polymeric or plastics frame 40 formed for example by injection moulding. The rotor frame 40 comprises a central rotor hub 41 shown separately in FIGS. 11 and 12, 14 and 15, having a splined aperture 42 which is fitted to splines on the end of a drive shaft (see 9 in FIGS. 1B and 2 for example, and FIG. 13 which shows the end of the matching rotor shaft 9), and a perimeter portion 43 carrying a circumferential ring of permanent magnetic poles or multiple pole elements 44. The rotor frame 40 may be formed from a plastics material and the hub 41 of metal (for example, with the hub 41 insert-moulded into the centre of the plastic rotor frame 40, as visible in FIG. 9), or alternatively the rotor frame 40 may be formed as a single component from a single material such as a polymeric material or a metal.

Figure 14:
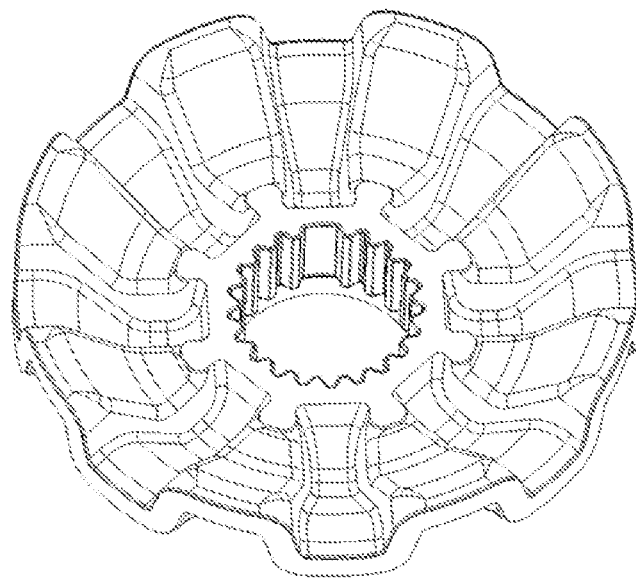
FIG. 14 is a perspective view from one side of an alternative hub component to that shown in FIGS. 11 and 12, which may be used in the rotor of FIGS. 6 to 9.
Figure 15:
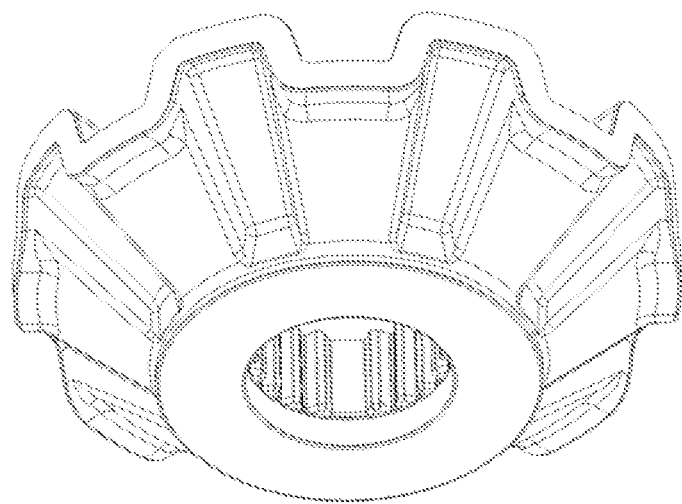
FIG. 15 is a perspective view from the other side of an alternative hub component to that shown in FIGS. 11 and 12, which may be used in the rotor of FIGS. 6 to 9.

An alternative rotor hub 41 is shown in FIGS. 14 and 15.

Between the hub 41 and perimeter portion 43 the rotor comprises a leg portion 45 and an annular portion, which together provide a structural connection between the hub 41 to a perimeter portion 43 of the rotor. The leg portion 45 comprises a plurality of legs 45a and 45b extending from the hub 41 radially outwards towards annular portion 46. The alternating legs 45a and 45b are axially spaced, at least towards the hub or inner ends of the legs. That is to say, each leg has an inner end at the hub, and the inner ends of a first plurality of legs 45a are axially spaced from the inner ends of a second plurality of legs 45b, so that there are axial gaps between the first plurality of legs 45a and the second plurality of legs 45b. Thus the first plurality of legs 45a and second plurality of legs 45b extend at different angles to the rotational axis through the hub. In the embodiment shown the first plurality of legs 45a are maximally spaced at their inner ends and are less axially spaced from, or are not axially spaced from, outer ends of the second plurality of legs 45b at their outer regions where they engage the annular portion 46. By way of further example, the legs may be arranged substantially as described in U.S. Pat. No. 9,325,210, the entirety of which is incorporated herein. At a region radially outward of the hub, the legs (which are axially spaced at their inner ends) may converge to common axial position, which is substantially coincident with that of the annular portion 46.

The annular portion 46 is between the leg portion 45 and the perimeter portion 43. It comprises a plurality of substantially planar first wall segments 46a, each defining an upper face of the rotor frame 40, and a plurality of substantially planar second wall segments 46b axially offset below the first wall segments 46a. The first wall segments 46a and second wall segments 46b of the annular portion 46 are arranged adjacent one another in an alternating fashion about the central axis of the rotor frame 40, each wall segment being connected to its adjacent wall segment by an axially directed wall portion 47. Also in the embodiment shown, annular wall parts or ribs 49 extend between adjacent wall segments 46a and 46b. In the embodiment shown the annular portion 46 comprises two radially spaced annular wall parts or ribs 49 between each pair of adjacent wall segments 46a and 46b.

In some embodiments the substantially planar first wall segments 46a and substantially planar second wall segments 46b extend at different angles relative to the rotational axis through the hub—that is, they lie upon planes that are angularly offset from one another. The wall segments 46a and 46b may be integral with or connect to the radially outer regions of the legs 45a and 45b. In this manner the planar wall segments 46a, 46b co-operate with the legs 45a and 45b to enhance the rigidity and strength of the rotor frame 40 (in comparison to a rotor frame 40 with only legs 45a, 45b, and no offset planar wall segments connecting the legs to the perimeter) without adding significantly to the mass of the rotor frame.

Typically the radial dimension of the annular portion 46 is approximately equal to the radial dimension of the leg portion 45 and/or is approximately equal to the radial length of the salient poles and coils on the stator. For example the radial dimension of the annular portion 46 may be between 0.5 and 1.5 times the radial dimension of the leg portion 45 and/or the radial length of the poles and coils on the stator.

Figure 10:
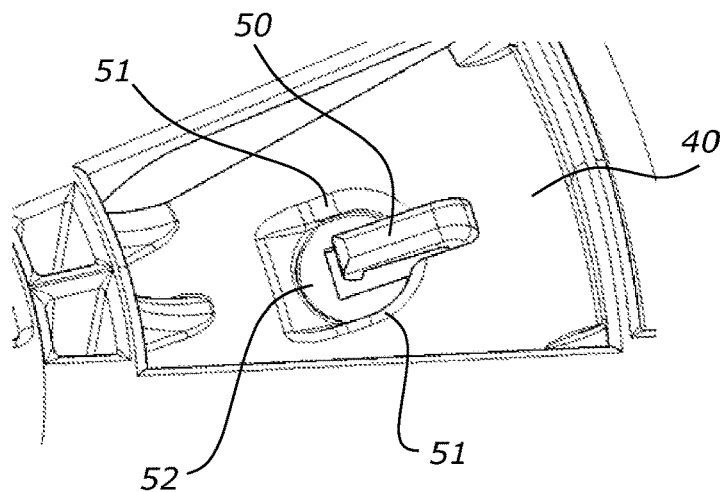
FIG. 10 is a view of a part of the rotor of FIGS. 6 to 9 showing a sensor magnet mount.
Figure 11:
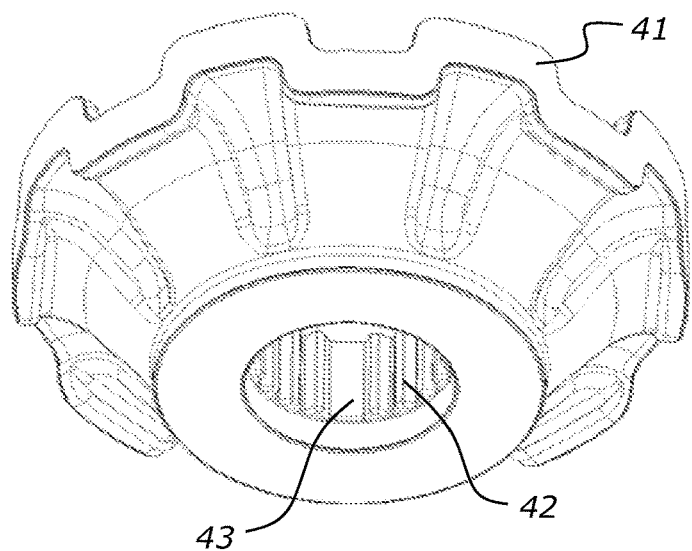
FIG. 11 is a perspective view from one side of a hub component of the rotor of FIGS. 6 to 9.
Figure 12:
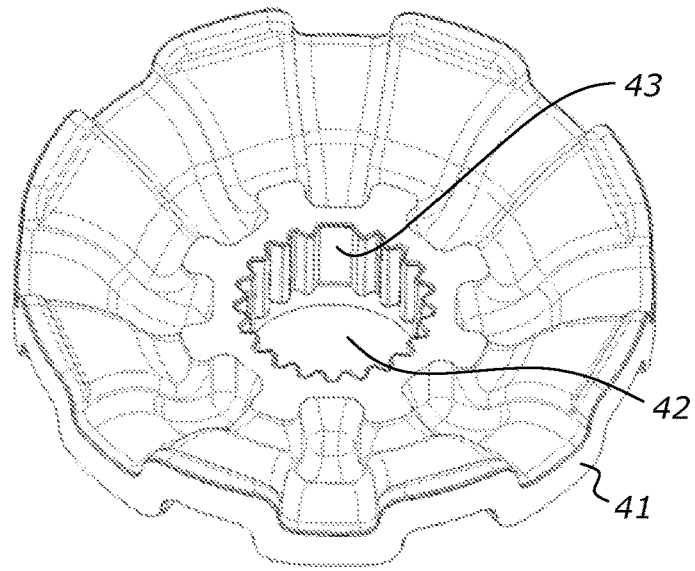
FIG. 12 is a perspective view from the other side of a hub component of the rotor of FIGS. 6 to 9.
Figure 13:
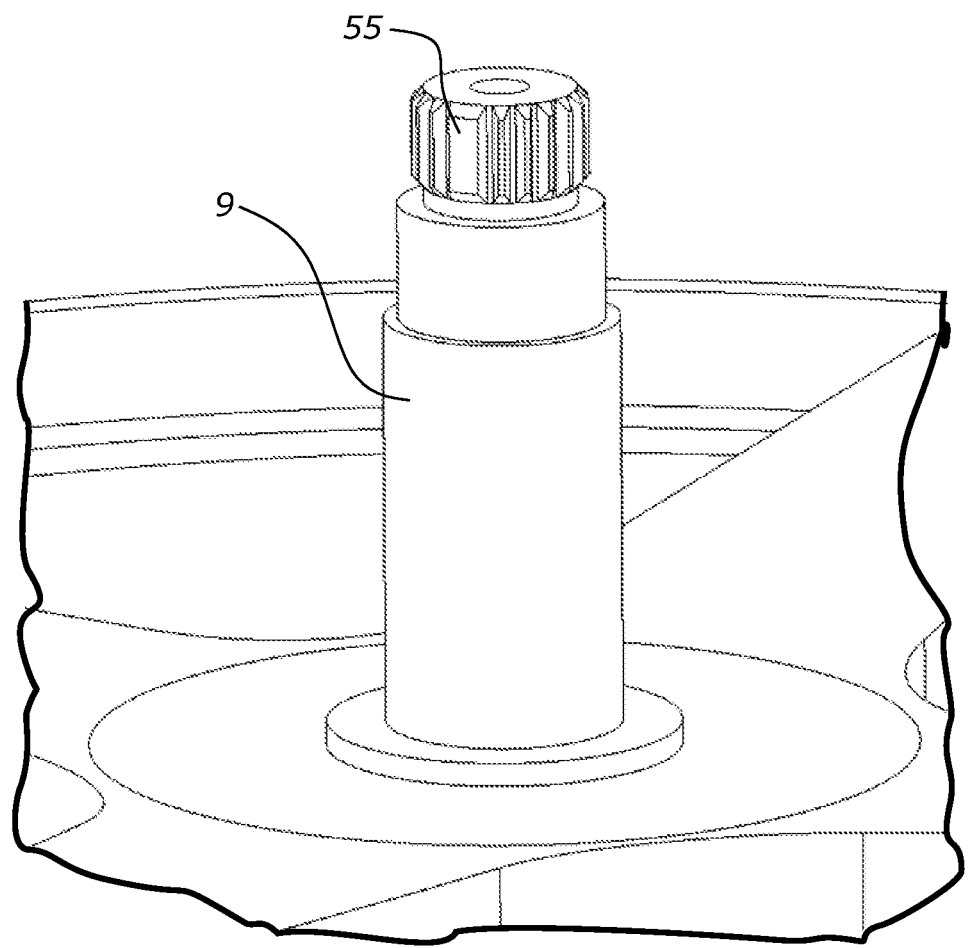
FIG. 13 is an enlarged view of the end of a matching rotor shaft.

Referring to FIG. 10, in a preferred embodiment the rotor frame 40 is formed from a polymeric material and includes a mount, integrally moulded with the frame, for a separate component such as a magnet (not shown), which interacts with a sensor on the stator to indicate an absolute angular position of the rotor relative to the stator at least once per revolution. The mount may comprise a flexible hook 50. Surrounding surfaces and abutments 51 define a recess 52 in the frame below the hook 50 which also support the component against forces and accelerations experienced in operation, without support or assistance from any additional components.

In a preferred embodiment the hub 41 comprises the axially extending opening 42 for engagement with the rotor shaft, and also a specific protrusion or recess 43 for interacting with a corresponding keying protrusion 55 on the shaft (see FIG. 13) or alternatively recess, to ensure that the rotor can only be mounted to the shaft in a single absolute angular position. Essentially the hub has a missing spline tooth for angular alignment While in the figures the rotor comprises a plastics frame 40 a rotor hub 41 formed as a separate metal component, alternatively the frame and hub may be formed of a single material for example from metal pressing or casting, or of a plastics material.

Motor Type

As stated an electric motor of the invention preferably comprises both a rotor and stator as described above.

Electric motors used in direct-drive laundry machines are commonly of the radial flux-permanent magnet synchronous motor type (RF-PMSM), with an external rotor, and the rotor and stator shown in the figures and described above are of an RF-PMSM motor. Alternatively the motor may be an axial flux permanent magnet synchronous motor (AF-PMSM) motor. An AF-PMSM motor is one in which the magnetic flux air gap is oriented axially.

The motor may be an electric motor in any form, with permanent magnets. For example the motor may be a permanent magnet synchronous motor (PMSM), either a radial flux-permanent magnet synchronous motor—the magnetic flux path is oriented radially (RF-PMSM motor) or an axial flux permanent magnet synchronous motor—the magnetic flux path is oriented axially (AF-PMSM motor). Alternatively the motor may be a DC brushed or brushless motor (DCBM) with permanent magnets. The motor may have an external or internal rotor carrying the permanent magnets. The motor may be a direct drive electric motor—namely a motor in which the motor directly drives an output drive shaft or drum or tub or basket of a machine without a belt or other form of motion transmission device between the rotor and shaft, or an indirect drive motor.

The invention has thus far been described with reference to multiple pole pair permanent magnets on the rotor of an electric motor. However the multiple pole pair permanent magnets may instead be on the stator such as on the stator of a DC brushed motor. Thus the invention includes an electric motor comprising a stator comprising the multiple pole pair permanent magnets, and all of the foregoing description of embodiments of the invention applies equally substituting stator for rotor and vice versa.

The invention includes laundry washing machines or dryers or washer-dryers incorporating an electric motor according to the invention, such as top-loading, vertical axis washing machines, front-loading or top or tilt access, horizontal axis laundry washing machines or top-loading, vertical axis laundry washing machines, and laundry dryers or washer-dryers, which are conventionally horizontal access. Typically a laundry machine comprises an outer cabinet with a top or front door, an outer drum/tub, and a rotating inner drum/basket which in use holds the laundry load. Typically the stator of the electric motor of the machine is fixed to one end of the outer drum/tub and the rotor external to the outer drum is rotationally fixed to the outer end of a rotor/basket shaft which extends through a passage in the end of the outer drum/tub and carries the inner drum/basket at its other end. A machine controller and/or motor controller (not shown) provide appropriate commutation signals to stator windings provided around the stator poles so that the rotor's rotational speed and direction may be dictated during the various cycles of a user-set wash programme of the machine.

The foregoing describes the invention including preferred forms thereof. Modifications and alterations as will be obvious to those skilled in the art may be made without departing from the scope of the invention.

The invention claimed is:
1. A stator for an electric motor for a washing machine or dryer or washer-dryer, comprising:
   a core of magnetically permeable material including an annular core ring and stator poles spaced around and extending radially outward from the core ring; and
   a polymeric insulating structure surrounding the stator poles and comprising a region that at least partially encapsulates the core ring,
   wherein the polymeric insulating structure further comprises a plurality of fastener supports for receiving fasteners to fix the stator; and
   wherein the polymeric insulating structure further comprises one or more shelves extending radially inwards from the region of the insulating structure which at least partially encapsulates the core ring,
   the shelves comprising upper surfaces which are offset below an upper surface of the core ring and configured to carry, at said upper surfaces, electrical terminal mounts for connecting to the stator coils, such that one or more of the terminal mounts is located at least partially below the upper surface of the core ring.
2. A stator as claimed in claim 1 wherein either or both of:
   a. the shelves, and
   b. the fastener supports
   are integrally formed with the insulating structure.
3. An electric motor for a washing machine, or dryer, or washer-dryer, comprising a stator according to claim 1 and a concentric rotor.
4. A stator as claimed in claim 1 wherein the terminal mount is configured as a pocket.
5. A stator as claimed in claim 4 wherein the terminal parts on the lead wires are low profile terminals such as flag terminals.
6. A stator as claimed in claim 4 wherein one or more of the shelves is configured with a strain relief tab to engage one or more of the lead wires.
7. A stator as claimed in claim 1 further comprising lead wires for connecting to the stator coils.

8. A stator as claimed in claim 1 wherein the shelves are structurally separated from the fastener supports by gaps.

9. A stator as claimed in claim 8 wherein one or more of the shelves are configured to carry one or more terminal mounts such that the terminal mount is located wholly below an upper surface of the core ring.

* * * * *